Jan. 23, 1968  J. B. GUNN  3,365,583
ELECTRIC FIELD-RESPONSIVE SOLID STATE DEVICES
Filed June 12, 1964  9 Sheets-Sheet 1

INVENTOR
JOHN B. GUNN

BY *John F. Ohlandt Jr.*
ATTORNEY

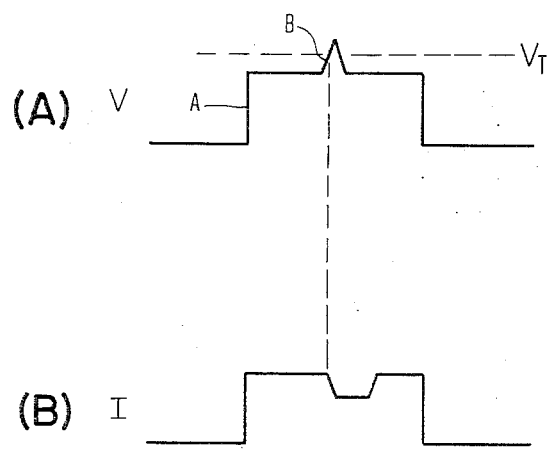
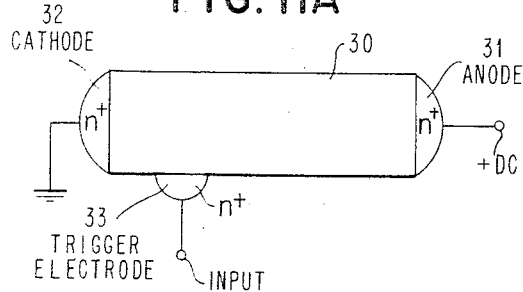
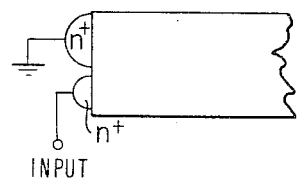
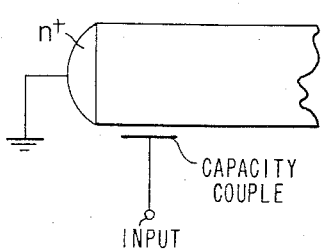

FIG. 15A
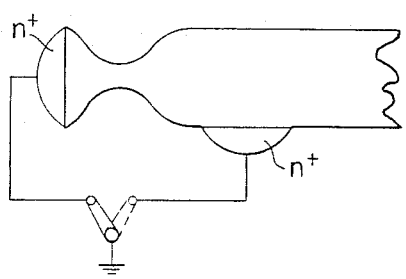
FIG. 15B
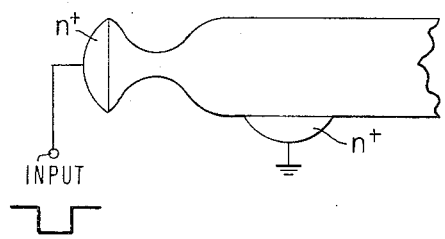
FIG. 16A
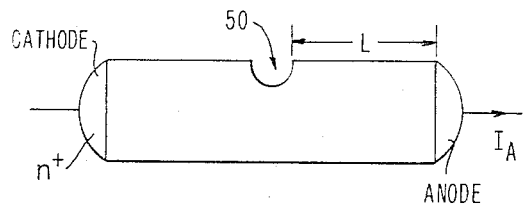
FIG. 16B
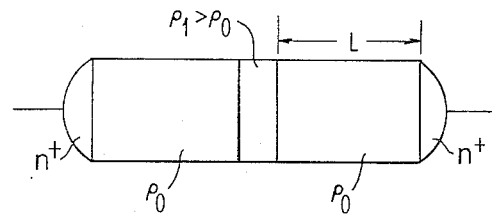
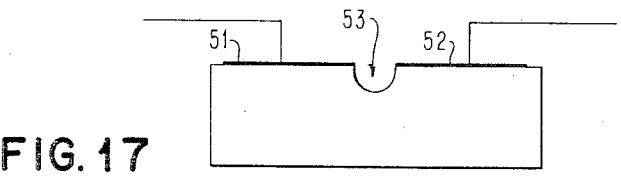
FIG. 17
FIG. 18
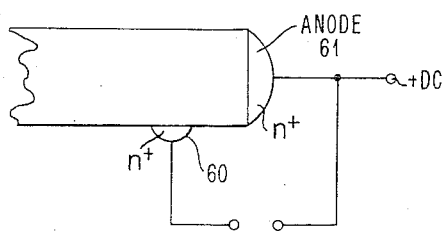

FIG. 19A
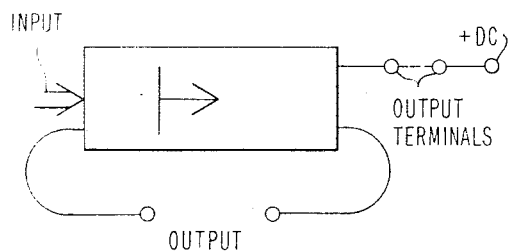
INPUT
+DC
OUTPUT TERMINALS
OUTPUT
FIG. 19B
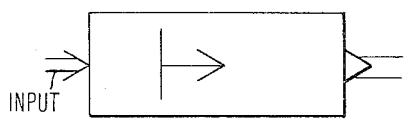
INPUT
⇒ LAUNCHING APPARATUS
⇒▷ LOCAL SIGNAL EXTRACTING APPARATUS
⇢ SHOCK WAVE
FIG. 19C
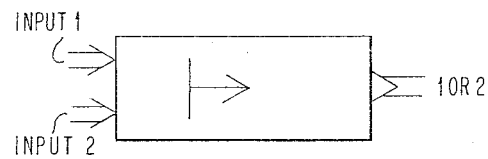
INPUT 1
INPUT 2
1 OR 2
FIG. 19D
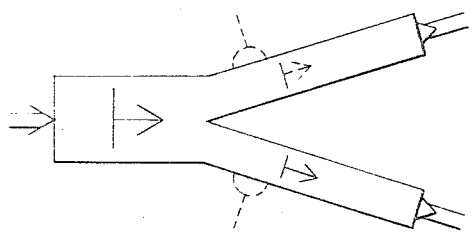
FIG. 19E
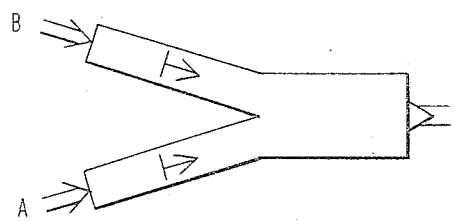
B
A
FIG. 19F
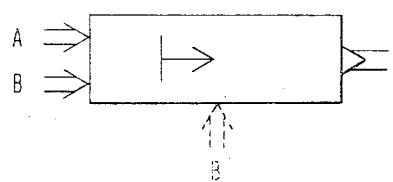
A
B
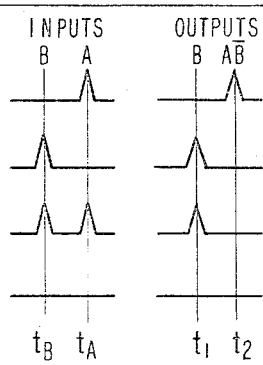
INPUTS    OUTPUTS
B  A      B  AB
$t_B$ $t_A$    $t_1$ $t_2$ United States Patent Office 3,365,583
Patented Jan. 23, 1968

3,365,583
ELECTRIC FIELD-RESPONSIVE SOLID
STATE DEVICES
John B. Gunn, Yorktown Heights, N.Y., assignor to International Business Machines Corporation, New York, N.Y., a corporation of New York
Continuation-in-part of application Ser. No. 286,700, June 10, 1963. This application June 12, 1964, Ser. No. 374,758
61 Claims. (Cl. 307—205)

This invention relates to solid devices and, more particularly, to a novel device whose operation is based on the formation of electrical shock waves in crystalline materials and, more specifically, in semiconductor crystalline bodies.

This application is a continuation-in-part of application Ser. No. 286,700, now abandoned. The invention disclosed in the above-mentioned application, which was also assigned to the assignee of the present invention, was conceived in terms of a solid state microwave oscillator. However, it has been discovered that the basic underlying phenomenon which gives rise to the formation and amplification of microwaves as described in the latter application can also be utilized in other modes and types of operations. Accordingly, a whole range or class of devices is envisioned in view of the fundamental character of this underlying phenomenon.

The observable effect which led to the development of the microwave oscillator described in application Ser. No. 286,700 was the instability discovered in certain semiconductor crystals, notably of GaAs and InP, when subjected to high electric fields above a certain threshold in volts/cm. When a uniform electric field of such high value is applied to a crystal specimen, the aforesaid instability is observed as a fluctuation of the current flowing when a constant voltage is applied between two "ohmic" contacts attached to the crystal. A time dependent decrease in the current is observed under these conditions; this decrease, which in long specimens resembles random noise, is in short specimens found to be periodic and of an extremely high frequency determined by the specimen length.

It has since been discovered that the aforesaid current instability is associated with the occurrence of moving regions of very high electric field (shock waves) which propagate with a velocity of the order of $10^7$ cm./sec. Hence, the previously observed microwave oscillations are but a single peculiar manifestion of the underlying phenomenon of electrical shock waves whose movement, in this particular case, happens to be cyclical in nature through the specimen, that is, they move from one end (the cathode) to the other end (the anode) and they repeat this movement over and over again.

A fundamental object of the present invention is to provide devices utilizing electrical shock waves in their various manifestations in crystalline bodies.

Another basic object is to exploit the extremely high speed phenomenon of the electrical shock waves present in crystalline bodies to perform logical functions in a distributed structure.

A specific object of the present invention is to permit the generation of microwave power.

Another object of the present invention is to enable the generation of microwave power at frequencies above 100 megacycles.

A further object of the present invention is to provide a microwave oscillator which develops frequencies on the order of 500 to 6500 megacycles.

An additional object of the present invention is to provide a microwave oscillator whose operation is dependent upon high electric field effects which occur in semiconductors.

Another object of the present invention is to produce microwave oscillations in a device which is characterized by a very simple structure.

A more specific object is to obtain microwave oscillations above 100 megacycles in a device comprising small element or wafer of semiconductor material to which only ohmic contacts need be made.

A further object is to provide microwave oscillations which are substantially independent of external circuit means.

Another object is to provide a microwave oscillator device having only two terminals.

Another object is to provide a simple oscillating device which is not dependent on the manifestation of negative resistance in its VI characteristic.

Another object is to provide a microwave oscillator which can be rapidly and very simply modulated.

A further object is to provide amplification by the utilization of electrical shock waves produced in a crystalline body.

Additional objects are to provide applications for the aforesaid electrical shock wave phenomenon to perform the functions of amplifying, pulse forming, stretching, and delaying and, also, logical functions of various types, for example, AND, INCLUSIVE, OR, NOR, INHIBIT, etc.

The foregoing and other objects, features, and advantages of the invention will be apparent from the following more particular description of preferred embodiments of the invention, as illustrated in the accompanying drawings.

In the drawings:

FIGURES 10A and 10B are pulse diagrams illustrating the voltage applied to the semiconductor body and the resultant current through the semiconductor body, respectively.

FIGURES 11A, 11B, and 11C are schematic diagrams illustrating several schemes for the imposition of local high fields.

Figure 12:
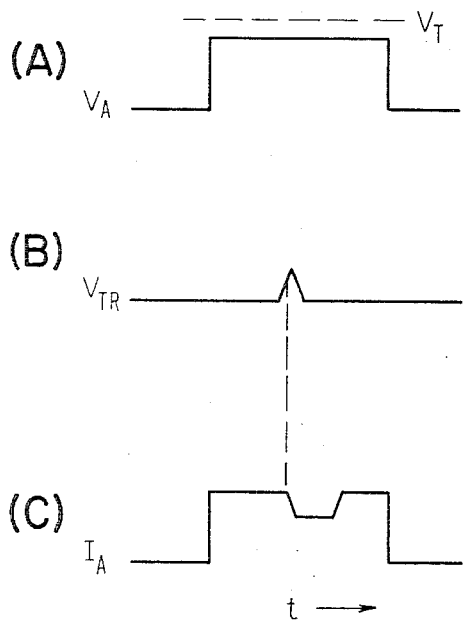
Figure 13:
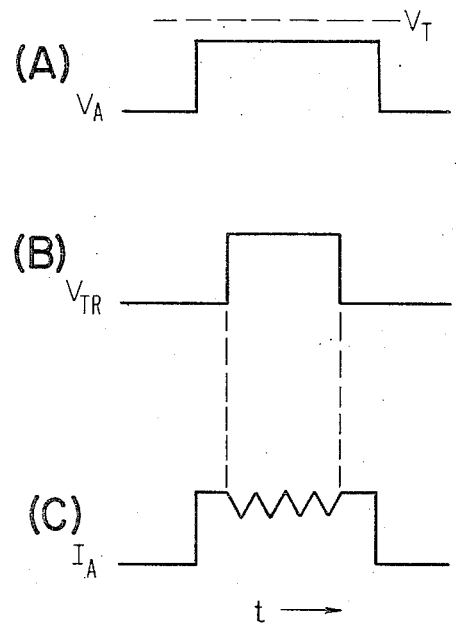

FIGURES 12 and 13 are output pulse diagrams for various voltage wave forms applied to the device of FIGURES 11A, 11B, and 11C.

Figure 14:
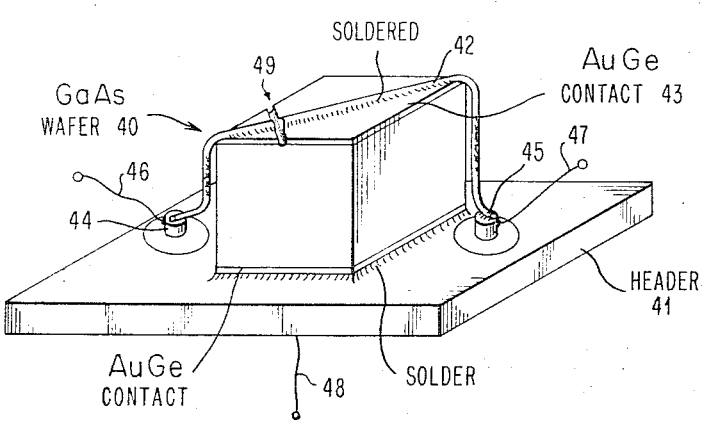

FIGURE 14 is a perspective view of a typical semiconductor body shown connected to a header for installation in a circuit.

FIGURES 15A and 15B are schematic diagrams illustrating other ways of producing a local high electric field.

FIGURES 16A and 16B show still further methods of launching shock waves.

FIGURE 17 illustrates another arrangement for controlling the launching of shock waves.

FIGURE 18 is a schematic diagram illustrating the pick off of a voltage across part of the semiconductor body.

FIGURES 19A through 19F are symbolic representations for a number of applications involving combinations of means for launching shock waves and means for extracting information therefrom.

*Microwave oscillator*

There have existed a number of basic techniques for the generation and amplification of microwaves. Conventional devices that are useful for producing frequencies in the microwave range are, for example, the travelling wave tube and its variant, the backward wave oscillator, as well as the magnetron oscillator, the reflex klystron and others. However, such devices have been pushed to their practicable limits, due to their well known bulkiness, fragility, etc., in obtaining operation at extremely high frequencies above 100 megacycles.

Another conventional device for microwave generation is the transistor oscillator. However, this device is limited to the production of very small output powers at moderately high frequencies. Another semiconductor device is one which exploits the so called nostron oscillations within a semiconductor body and which exhibits a negative resistance region in its current-voltage characteristic. However, the nostron oscillator is necessarily limited to extremely small dimensions on the order of microns.

Negative resistance effects have also been exploited in other devices such as the tunnel diode and avalanche injection diode to provide high frequency oscillations.

The aforesaid conventional transistor oscillator, the nostron oscillator and other negative resistance oscillators that have been proposed heretofore are extremely dependent on the external circuitry in the form of resonant circuits for proper operation.

Another device for generating microwaves which has achieved prominence in recent years is the maser, the term standing for "microwave amplification by stimulated emission of radiation." The maser is a device which relies on atomic and molecular processes within substances, generally when in the gaseous or solid state. Some limitations, however, are imposed upon the useful frequencies of operation for masers due to the fact that complicated and bulky arrangements must be provided for pumping these devices and, further, the pump frequency must usually be of higher frequency than the generated frequency.

The microwave oscillator of the present invention shares with certain of the maser devices the capability of providing substantial microwave output power from the solid state.

The instant microwave oscillator device differs sharply from all the foregoing devices discussed above in that it relies primarily on a naturally occurring phenomenon which produces oscillations virtually independently of external circuitry and whose principle of operation is believed to depend on the interactions in semiconductor crystals between phonons and charge carriers, i.e., holes or electrons, under the influence of extremely high electric fields. Phonons, as that term is understood in the art, refers to quanta of the lattice vibrations in a crystal.

When an electric field is applied to a homogeneous semiconductor specimen which is in thermal equilibrium, this equilibrium is lost, and, in the most general case, the interactions between the field of the carriers and the scattering mechanisms become very complex. In the ordinary theory of carrier mobility, a drastic simplification is made by assuming that, while the carriers may have directed drift velocity superimposed upon their random thermal motions, their total energy remains unchanged by the application of the field. However, this assumption is strictly justified only for vanishingly small values of the field, and, for finite values, the electron temperature exceeds that of the lattice. Thus, because the scattering is in general dependent on the carrier temperature, it follows that a change in mobility will be observed when the carrier temperature has been raised by the field. Thus, there are high field effects in which a departure from Ohms law results from a change in carrier mobility while the carrier density remains constant. Further, another type of departure occurs when the field becomes so high that additional carrier pairs are generated by the ionization of lattice bonds.

For a full development of the theory of mobility changes which occur in a high electric field, reference may be made to an article in Progress in Semiconductors, edited by A. F. Gibson, Heywood and Co., Ltd., London, 1957, at p. 213, and reference may also be made, as indicated in that article, to the various theories propounded by Landau and Kompanejez, by Guth and Mayerhofer, by Seitz and Shockley, etc. For recent reports on experiments that have been conducted involving electric field effects and associated "hot electron" phenomena and "plasma" formation, reference may be had to:

(1) "The Oscillistor—New Type of Semiconductor Oscillator," Journal of Applied Physcis, vol. 31, No. 9, September 1960, by R. D. Larrabee and M. C. Steele.

(2) "Observations of Electron-Hole Current Pinching in Indium Antimonide" by M. Glicksman and R. A. Powlus, Physical Review, vol. 121, No. 6, Mar. 15, 1961.

(3) "The 'Sogican'—New Type of Semiconductor Oscillator" by M. Kikuchi and Y. Abe, Journal of the Physical Society of Japan, vol. 17, 1962, pp. 881–882.

(4) "Hot Electrons in Indium Antimonide" by M. Glicksman and W. A. Hicinbothem, Jr., Physical Review, vol. 129, No. 4, Feb. 15, 1963.

More pertinent to the basic phenomenon underlying the present invention is believed to be the prior art knowledge with regard to the cooperative interactions of a traveling wave nature between coherent waves of lattice vibrations in solid materials and a stream of free charge carriers moving through these materials. In most cases of interactions between lattice vibrations and charge carriers which have been considered previously by workers in the art, the lattice modes have been acoustical in nature and the potential with which the carriers interact has arisen either from changes in the energy gap, from the relative displacement of conduction band minima, or from piezoelectric polarization resulting from certain transverse modes of vibration in polar lattices lacking a center of inversion. For a detailed description of several of these cases, reference may be had to:

(1) G. Weinreich, Physical Review, 104, 321, 1956.

(2) G. Weinreich, T. M. Sanders and H. G. White, Physical Review, 114, 33, 1959.

(3) A. R. Hutson and D. L. White, Journal of Applied Physics, 33, 40, 1962.

The description hereinafter will make particular reference to one semiconductor material, namely GaAs, with which numerous experiments have been performed following the discovery of the basic underlying phenomenon of the present invention. It will be understood, however, by those skilled in the art that other semiconductor materials, particularly polar semiconductors, may also be utilized in accordance with the principles of the present invention.

Figure 1:
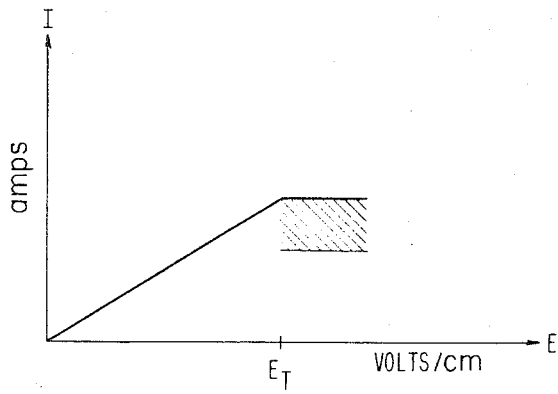
FIGURE 1 is a plot of the current vs. electric field illustrative of the basic phenomenon of the present invention.

Referring now to FIGURE 1, there is depicted a graph illustrating the relationship between the current through a semiconductor sample and the intensity of electric field E applied across this sample. It will be noted that the graph shows a substantially linear relationship between current I and average electric field E up to a threshold value of electric field $E_T$. Thereafter, a discontinuity appears and it is beyond this point that the oscillatory phenomenon according to the present incention is operative. For values of E greater than $E_T$, the current fluctuates in time even while E remains constant. The maximum value of the current does not usually exceed the steady values which it has at $E_T$ whereas the minimum value may be substantially less than the value at $E_T$. This time variation of current is symbolized by the shaded region in FIGURE 1. For example, if the electric field is applied by means of a short voltage pulse corresponding to an amplitude equal to or less than $E_T$, the current will have the time variation shown in FIGURE 2A; if the amplitude exceeds $E_T$, the variation of current will be that shown schematically in FIGURE 2B, high frequency fluctuations being superimposed on the basic pulse shape.

It will be noted that in FIGURE 1, immediately after the threshold value $E_T$ is reached and operation commences in the shaded region, there is exhibited a sharp drop in conductivity. Thus, the discontinuity at $E_T$ cannot be associated with an increase in the number of charge carriers within the semiconductor sample, for example, an n-type GaAs disc or wafer. In operation, there is a predominance of only one type of charge carrier. As is evident from FIGURE 1, the exhibited drop in conductivity is clearly indicative of the activity of substantially only one type of charge carrier within the wafer.

Figure 3:
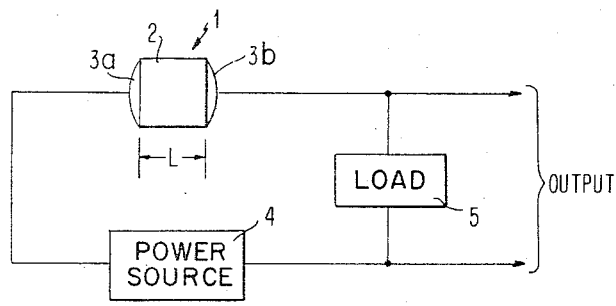
FIGURE 3 is a simple schematic illustration of the basic device of the present invention connected in circuit to provide microwave oscillations.

In FIGURE 3, which is a schematic illustration of one embodiment of the present invention, there is shown the basic device 1 which consists essentially of a semiconductor wafer 2, typically of GaAs, as previously referred to in connection with FIGURE 1. As is indicated in FIGURE 3, this wafer has a thickness or length denoted by the symbol L which will be referred to hereinafter. The semiconductor wafer 2 has contacts 3a and 3b affixed thereto. These contacts comprise dots, typically of Sn, which are formed by alloying to the wafer 2. Shown connected to the wafer 2 is a source of power 4, for example, a constant voltage source, and suitable conductors attached to the contacts 3a and 3b for applying a voltage to the wafer 2 thereby creating an electric field of such predetermined value within the wafer 2 as to produce the effects previously noted, that is, the sharp drop in conductivity and the concommitant generation of microwave power. A load 5 is also shown connected in the circuit and the output is derived therefrom.

For the sake of simplicity, FIGURE 3 is a schematic showing and, in actual operation, a convenient matching network would be interposed between the generator, that is, the active device 1, and the load 5.

Figures 2A, 2B:
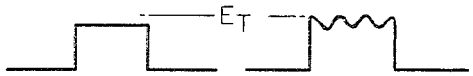
FIGURES 2A and 2B are diagrams of current pulse shapes obtainable due to the phenomenon of the present invention.

In actual tests with GaAs samples, it has been found that in long samples (approximately 1–10 mm.) the fluctuations are random and consist of very intense noise with components up to 2000 megacycles/sec. In short specimeans (less than $2 \times 10^{-2}$ cm. or 0.2 mm.) the fluctuations take the form of coherent oscillations, as depicted in FIGURE 2B, whose value depends on the length L of the sample in the direction of current flow, as illustrated in FIGURE 3.

The frequencies $f$, of oscillation are found to be given by the expressions of $f = nv/L$ where, for a particular crystal of GaAs, where $n$ is an integer and $v$ is approximately equal to $10^7$ cm./sec. which is approximately equal to the drift velocity of the electrons at the threshold value of field $E_T$ where the oscillations first appear. Usually the frequency given by $n=1$ is the only term, but strong harmonics up to $n=5$ have sometimes been found and occasionally the term $n=1$ is entirely absent. These dimensional resonances have been observed under the range of $v/L$ from 0.5 to 4.5 $Gc/S$ (where $Gc/S$ stands for gigacycles or $10^9$ cycles/sec.) and, in a sample of irregular geometry, oscillations have been observed at $f=6.5$ $Gc/S$. Even in this last case, the oscillations appear to build up within a few cycles so that extremely rapid modulation is possible.

When the external circuit has negligible impedance, the depth of modulation of the same current may reach 30%. As stated previously, by the use of a matching network, for example, a resonant cavity, the sample may be matched to an external load. With such an arrangement, the overall efficiency of conversion from D.C. to R.F. is 1–10%. The mean output power is limited by the thermal properties of device construction, but peak power of 4.5 watts at about 1 $Gc/S$ and 0.15 watts at 3 $Gc/S$ have been measured.

Having described the microwave oscillator embodiment of the present invention and the essential circuitry associated therewith, attention is now turned to the techniques that may preferably be employed for preparing the wafer, for making suitable contact to the semiconductor wafer, and for encapsulation of the entire device package.

The microwave oscillator embodiment as disclosed requires a structure consisting typically of a piece of n-type GaAs with plane parallel ends having "ohmic" contacts attached thereto. To provide this structure, the following steps are followed. A piece of single crystal GaAs is lapped into a thin slice with a thickness or length, typically 40 microns or 0.4 mm., which is slightly greater than the required sample length L, and discs 0.75 mm. in diameter are cut from the slice with an ultrasonic tool. After etching for a predetermined time in an etch producing a smooth surface on n-type GaAs (e.g., white etch; sulphuric-peroxide etch), the discs are then ready for the next step.

Since ohmic contacts are desired, an n+ layer must be formed on the faces of the discs. In the present process, alloyed contacts are made using pure tin which is a donor in GaAs. Spheres of tin 0.75 mm. in diameter are prepared for use by heating them to a very high temperature ($\sim 1100°$ C.) on a graphite strip heater in an atmosphere of forming gas, holding a few minutes, and allowing them to cool. By using a heater with many dimples, a number of spheres may be treated at once. This treatment is necessary to improve the wetting of the GaAs by the molten tin in the later stages of the process.

Figure 4:
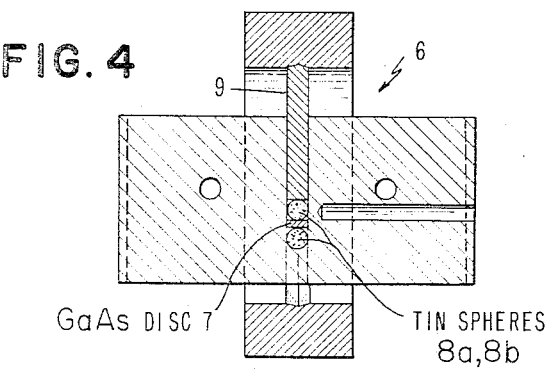
FIGURE 4 is a cross-sectional view illustrating the technique of applying contacts to the semiconductor sample.

As shown in FIGURE 4, alloying is carried out in the alloying jig 6. Immediately before loading, the GaAs disc 7 and all parts of the jig 6 are washed in 5% NaCN solution, rinsed in distilled water which has been kept out of contact with glass, and dried under vacuum. The assembled jig is then pre-fired in purified forming gas. These precautions are necessary in order to prevent the diffusion of traces of copper from the environment into the GaAs. In the absence of these precautions, the GaAs disc 7 would be converted to p-type during alloying and rendered useless.

The jig 6 of FIGURE 4 has the following features. The cavity in which alloying is carried out has a bore of 0.77 mm., just large enough to permit a tin sphere 8a to be inserted, followed by the GaAs disc 7, and a second tin sphere 8b. The clearance between the bore and the edge of the disc is too small to permit molten tin (which has a large angle of contact with GaAs) to penetrate and wet the sides of the disc. The block of graphite in which the cavity is bored is split to permit easy removal of the finished device, the two halves being located by hollow stainless steel dowels, not shown. A second horizontal bore at one end accommodates a Pt-Pt-Rh thermocouple, not shown, whose tip lies close to the alloying cavity. Heat for alloying is supplied by passing A.C. through the block of graphite. The whole system is enclosed in a glass cover, not shown, through which flows carefully purified and dried forming gas.

Because of the large angle of contact between molten tin and GaAs, the liquid metal will not spread to cover the whole of the faces or ends of the disc 7 and will not wet even a fraction of their area unless the temperature is raised to the point where a large amount of GaAs is dissolved. Under these circumstances, an undesirable biconcave form is given to the remaining GaAs. To overcome this difficulty, the alloying process is carried out under carefully controlled pressure, rather after the fashion of die-casting. A closely fitting graphite plunger 9 is inserted in the mould cavity when it is loaded, above the upper ends, and is weighted by an additional ring of graphite which is hung over its upper end. The upper end of the plunger fits into a depression or annular groove on the inner surface of the ring which hangs freely and surrounds the main block of graphite. The weight of the ring is chosen so as to force the molten tin spheres 8a and 8b into intimate contact with the plane faces of the GaAs without forcing the molten tin into the clearance between the circumference of the GaAs and the cylindrical bore or between plunger 9 and cylindrical bore. A weight of 0.3–0.5 gm. has been found satisfactory.

The heating cycle is controlled by passing a fixed A.C. which would bring the alloying jig 6 to equilibrium at a temperature higher than that desired for alloying. The output from the thermocouple is fed to a potentiometric recorder, not shown, fitted with a limit switch which turns off the current when the desired temperature is reached (500–550° C.).

By means of this system, GaAs oscillators can be produced having interfaces between semiconductor and contacts which are parallel within 5 microns or less.

Referring now to FIGURES 5A–5F, the several steps involved in the encapsulation of the device of the present invention are illustrated. After alloying, the initial structure consists of a disc 7 of GaAs, which is typically 25 microns thick and 0.75 mm. in diameter, sandwiched between the solidified Sn contacts 8a and 8b.

Figure 5A:
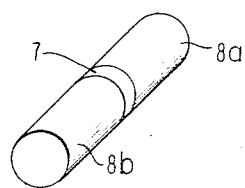
FIGURES 5A through 5F are views of the device of the present invention being packaged for use in a circuit.
Figure 5B:
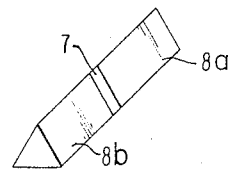
Figure 5C:
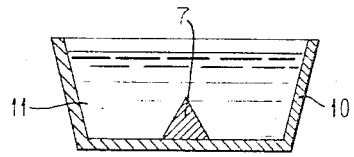
Figure 5D:
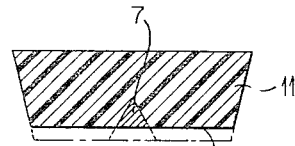

It is required (a) to be able to reduce the cross section of the active GaAs portion in a geometrically regular manner and (b) to be able to make very low inductance contacts to the external circuitry. These two objectives are met by the following system. The structure, as shown in FIGURE 5A, is first ground and polished with three plane faces parallel to the longitudinal axis so that the resultant transverse cross section is triangular and the overall shape of the structure is prismatic, as shown in FIGURE 5B. The structure of FIGURE 5B is then laid, as shown in FIGURE 5C, in the approximate center of a cylindrical mould 10 of TEFLON or similar material, approximately ½" in diameter, and an epoxy resin 11 is run into a depth of approximately 3/16". When the resin is hardened, the entire assembly of the device structure surrounded by resin is removed from the mould and the lower portion of the assembly is ground away up to the line 12 as shown in FIGURE 5D.

The foregoing procedure thus enables the reduction of the cross section in a very simple manner and permits convenient handling of the device.

Figure 5E:
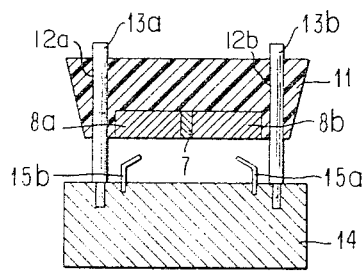
Figure 5F:
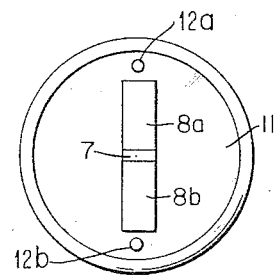

The block of resin containing the device is now mounted beneath a drilling jig, not shown. This jig consists of a hardened and ground steel plate containing three holes, two of which serve to guide a subsequent drilling operation. The third hole is covered by a small thin glass disc with an etched graticule on it which serves to define the direction and exact center of the line joining the other two holes. Under a microscope the device is aligned manually with the adjacent graticule and then clamped to the jig. The holes 12a and 12b are drilled into the hardened epoxy resin block 11 using the holes in the jig as guide bushings. These holes 12a and 12b are related in an exactly known way to the device, as shown in FIGURE 5F.

Electrical connection to the sample can now be made using one of a variety of holders. These holders vary in electrical details but are similar mechanically. As shown in FIGURE 5E, two steel pins 13a and 13b are fitted into holes, drilled with the jig mentioned above, into an insulating block 14. The pins 13a and 13b enter freely into holes 12a nd 12b, respectively, in epoxy block 11 holding the sample. Two thin strips 15a and 15b of phosphor bronze are fitted into the block 14 with their free ends on either side of the center line between the pins 13a and 13b. The strips 15a and 15b project above the surface of the block 14 and nearly parallel to the block and the free ends are tapered to about .005". By means of the drilling jig which can be slipped onto the pins, the ends of the strips 15a and 15b can be arranged to coincide with the Sn portions 8a and 8b. Thus, when fitted in place, strips 15a and 15b make electrical connection to the Sn portions 8a and 8b, even though they may be very narrow, while avoiding damage to the exposed surface of the GaAs disc 7.

Because of their short length and very close proximity to the grounded block 14, the inductance of the strips 15a and 15b can be made extremely low. The inductance of the packaged oscillator is essentially zero, and no expensive package is required, all oscillators fitting a same package even though their dimensions vary greatly. Finally, the cross section of the GaAs disc 7 is readily adjusted at any time by lapping the exposed surface.

Having described the first basic device embodiment of the present invention and the technique employed in its packaging and its encapsulation, it is considered well to summarize and restate in another way observations that have been made by examining the relationship between current and voltage at the terminals of the device. The superscripts given refer to explanatory statements hereinafter set forth.

When a potential V is applied between the ends of a bar of GaAs or InP of length L, the current at first rises linearly as voltage is increased from zero. When the threshold voltage $V_T$ is reached, however, the current begins to fluctuate[a]. At first, current decreases[b] to some value $I_{min}$ which is less than the steady current value $I_T$ corresponding to $V_T$. This decrease is followed by a rise in current to a value $I_{max}$ which is usually equal[c] to steady current value $I_T$ and then by further fluctuations between $I_{min}$ and $I_{max}$. If the voltage is now raised above $V_T$, the current continues to fluctuate, the value of $I_{max}$ usually remaining almost unchanged. [d]In the case of long specimens (L greater than 0.2 mm.), the fluctuation is almost completely random,[e] resembling white noise with a bandwidth of the order of $10^9$ cycles/sec. Short specimens (L less than 0.2 mm.) behave similarly[f] when the impedance of the external circuit is high, but generate coherent oscillations of current when the impedance is low[g]. The period of these oscillations is found to be equal to the transit time[h] of the electrons, calculated from the threshold current $I_T$. The oscillations normally build up to full amplitude within one cycle[i], have frequencies in the range $5 \times 10^8$–$6.5 \times 10^9$ cycles/sec, and values of $I_{min}/I_{max}$ of 0.7–0.8.

In GaAs, the threshold electric field varies[j] with L, from the value 1250 V/cm. at L=0.5 cm. to 3700 V/cm. at $L=2 \times 10^{-3}$ cm. In InP, the values are very scattered, but threshold fields of 6000 V/cm. are typical. In both materials, the magnitude of the threshold field and, in GaAs, the nature of the instability, are unaffected[k] by the nature of the contacts, the surface condition of the specimen, irradiation by light, or the application of a magnetic field.

For further information in expansion of the above summary, reference may be had to the IBM Journal of Research and Development, April 1964, p. 141.

*Electrical shock wave phenomenon and its application*

It has now been found that the previously observed fluctuations of current are associated with a moving distribution of electric field and hence, of potential within a crystal specimen.

*Observation methods and results thereof*

Figure 6:
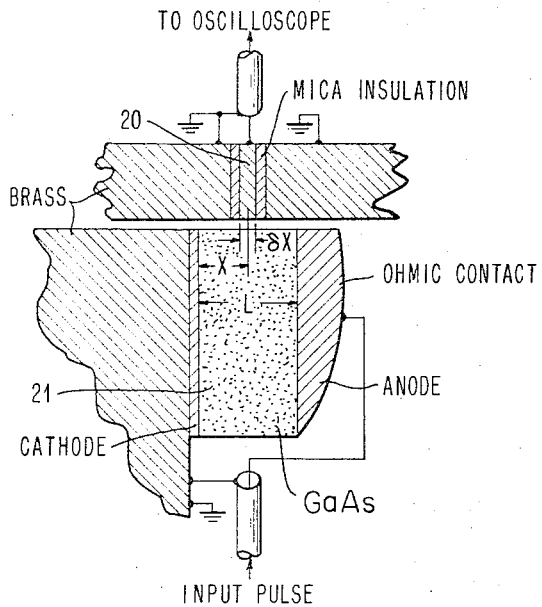
FIGURE 6 is a schematic diagram of a semiconductor sample and apparatus for measuring its parameters.

Referring now to FIGURE 6, the changing potential distribution V (x, y, t) over the plane surface of a typical specimen of GaAs was explored by a technique employing a capacitative probe 20 as illustrated therein. The separation of the probe 20 from the GaAs specimen 21 was kept small and constant, but its position along the GaAs specimen could be changed by a micrometer stage. The signal from the probe was led to a sampling oscilloscope (not shown) having a certain impulse response g(t) and an input resistance R. If the dimensions of the rectangular probe face in the $x$ and $y$ directions (that is, parallel and perpendicular, respectively, to the current flow in the GaAs specimen) are $\delta x$, $\delta y$ and its capacitance to the GaAs is C, the signal S displayed at the oscilloscope is:

$$S = \frac{CR}{\delta x \, \delta y} \int_{-\infty}^{\infty} \int_{y-\delta y/2}^{y+\delta y/2} \int_{x-\delta x/2}^{x+\delta x/2} g(t'-t) \frac{\partial}{\partial t} V(x', y', t) dx' dy' dt$$

For the apparatus used, $\delta x = 15$ microns, $\delta y = 270$ microns, and $g(t)$ was a peak less than $10^{-10}$ sec. in width. Thus, the signal S represents an approximation to the quantity $CR[\partial V(x, y, t)/\partial t]$ measured with resolutions of 15 microns, 270 microns and $10^{-10}$ second, respectively.

A normal sampling oscilloscope presentation of S as a function of time $t$ is very difficult to interpret, and alternative forms of display were employed. In the first type, the probe position was held fixed; the signal S was integrated electronically, and then displayed on an oscilloscope. The display given by the oscilloscope thus represented the time variation of the quantity $\int S(t') \, dt' \propto V(x, y, t)$ with $x$ and $y$ constant. In the second type of display, the instant of sampling $t$ was held fixed while $x$ was varied over the length of the specimen. The signal S was displayed on an oscilloscope whose horizontal deflection was proportional to $x$. This display gave a picture of $\partial V(x, y, t)\partial t$ as a function of $x$, the distance along the specimen, with $y$ and $t$ held fixed.

Measurements were made of a specimen of n-type GaAs of length $L = 210$ microns and cross sections $3.5 \times 10^{-3}$ cm.$^2$. Its resistance at low fields was 16 ohms. Rectangular positive pulses of a few nanoseconds duration were applied by a circuit with an impedance of 50 ohms so that approximately constant-current conditions were achieved, rather than the constant voltage conditions in the microwave oscillator embodiment. Instabilities of current occurred at specimen voltages above 59 volts.

Figure 7A:
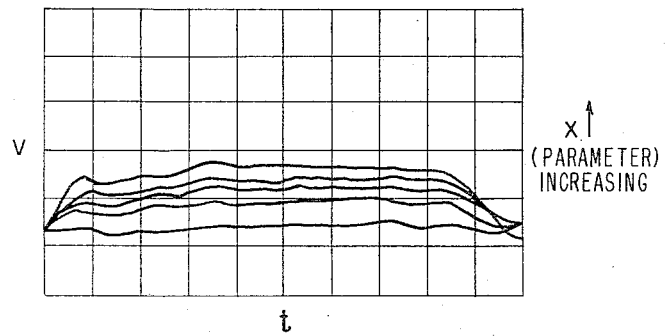
FIGURES 7A and 7B are graphs wherein voltage is plotted against time and with distance X along the sample as parameter.
Figure 7B:
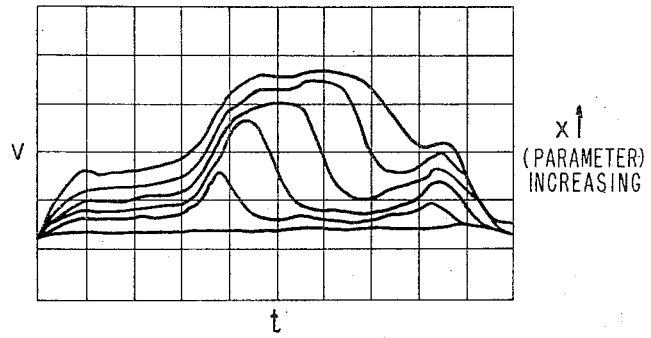

FIGURE 7A shows several wave forms V($t$), with the applied voltage just less than the threshold value of 59 volts, measured at equal intervals of $x$. It is apparent that, under these circumstances, the time variation of potential at a point $x$ merely reproduces that at $x=L$ multiplied by the fraction $x/L$, as would be expected for a homogeneous conductor. If the initial voltage exceeds the aforesaid voltage, however, very different results are obtained as illustrated in FIGURE 7B. When the instability begins at about the middle of the pulse, the potential at $x=L$ rises sharply, remains high until almost the end of the pulse and then drops rapidly again. At other points in the specimen, this variation is not reproduced. A roughly equal rise in potential of about 55 volts occurs simultaneously at all points, but the drop takes place earlier at small values of $x$. At a given value of $x$, the values of V before the rise and after the fall are approximately equal.

Figure 8:
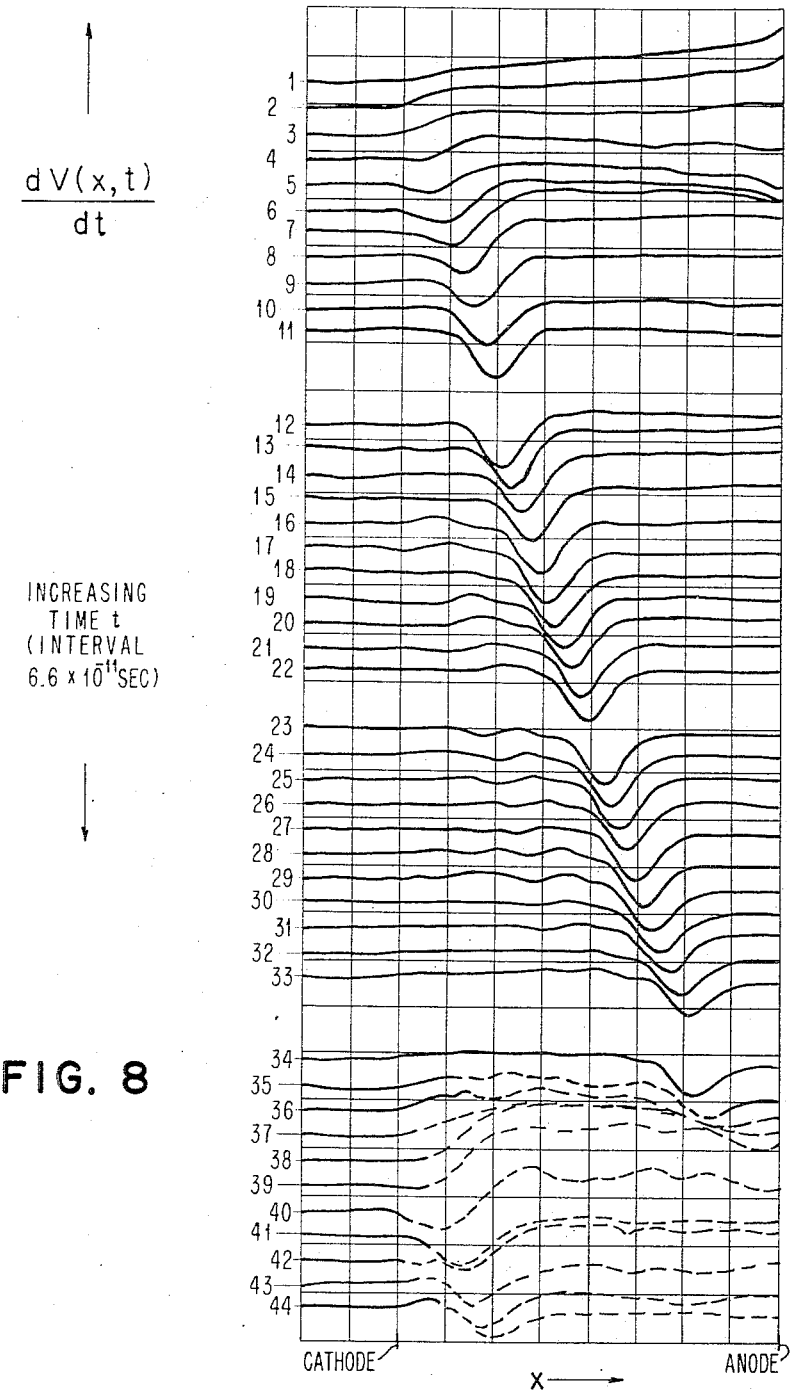
FIGURE 8 is a graph wherein $dV(X,t)/dt$ is plotted against the distance X.

Referring now to FIGURE 8, it will be appreciated that additional information is obtainable from a display of $\partial V/\partial t$ as a function of $x$ with $t$ as a parameter. The circumstances were the same as depicted in FIGURE 7B except that the amplitude of the applied current was slightly greater so that the instability occurred at the beginning of the pulse. In the trace indicated 1, at the top of the FIGURE 8, the variation of $\partial V/\partial t$ is approximately linear with $x$, showing that the electric field is building up uniformly in the specimen. In trace 2, obtained after a delay of $6.6 \times 10^{-11}$ secs, this linear distribution is beginning to undergo a distortion. By trace 11, this distortion has taken the form of a well-defined negative maximum of $\partial V/\partial t$, extending over about 30 microns; elsewhere in the crystal, $\partial V/\partial t = 0$. From this instant, this negative maximum propogates in the $x$ direction (which is also the direction of electron flow) with unchanged shape until, at about trace 34, it reaches the anode. From here on, the display becomes somewhat confused because of random differences between successive pulses, but it can be seen that the events of traces 2-11 are reproduced, at least in a general way, in traces 35-44. Inspection will show that the velocity with which the maximum travels is constant and equal to about $8 \times 10^6$ cm./sec. This value is about equal to that estimated from data on other specimens for the drift velocity of electrons at the threshold. The average electric field within the disturbance may be estimated roughly from the observed width and potential drop. The value found is about $2 \times 10^4$ V./cm.

Figure 9A:
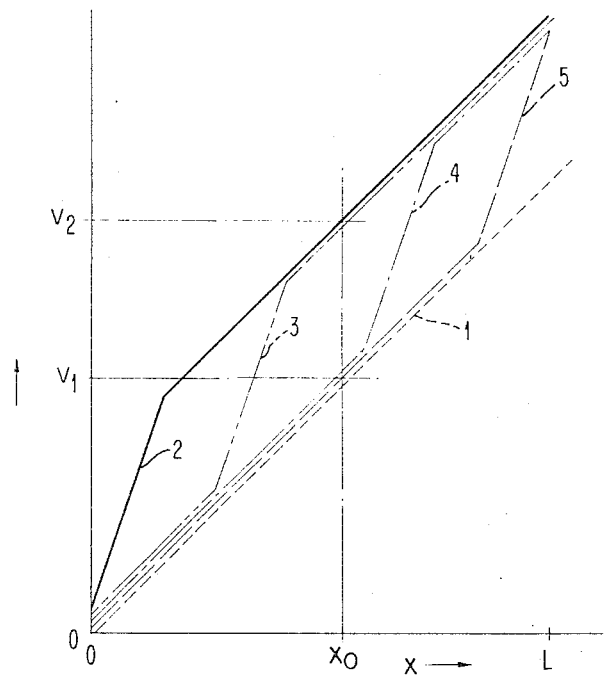
FIGURES 9A and 9B are diagrams wherein the data of FIGURES 7A, 7B, and 8 are represented by a time dependent potential distribution.

The data of both FIGURES 7 and 8 can be represented by a time-dependent potential distribution shown diagrammatically in FIGURE 9A. A fixed current is forced through the specimen of such a value that the threshold for instability is just exceeded. At the instant after the current is turned on, a linear distribution of potential exists (curve 1). Thereafter, the instability gives rise to a narrow region of very high local electric field (slope of potential distribution), which builds up near the cathode (curve 2). As time passes, the high field region propagates along the specimen while the local field elsewhere remains approximately constant (curves 3, 4 and 5). Finally, the high-field region reaches the anode at $x=L$ and passes out of the specimen. At some fixed intermediate point of observation $x_0$, the potential rises from $V_1$ to $V_2$ when the high-field region builds up, remains at $V_2$ while the high-field region is to the left of $x_0$, and then drops rapidly back to $V_1$ as the region passes $x_0$. Clearly, the drop will occur later at larger values of $x_0$ (cf. FIGURE 7B). The time derivative of potential is, of course, zero except within the high-field region as shown in FIGURE 8.

As it appears from FIGURE 8, once built up, the disturbance propagates with constant velocity and unchanged shape. Accordingly, such disturbance might be described as a shock wave which quickly reaches an equilibrium form. Consequently, the function $V(x, t)$ for the shock wave can be written in the form $V(x-ct)$ where $c$ is its velocity. Thus, the operations $\partial/\partial t$ and $-c \, \partial/\partial x$ are equivalent, and traces such as 11-34 in FIGURE 8 can also be interpreted as graphs of the electric field distribution $E(x)$.

Figure 9B:
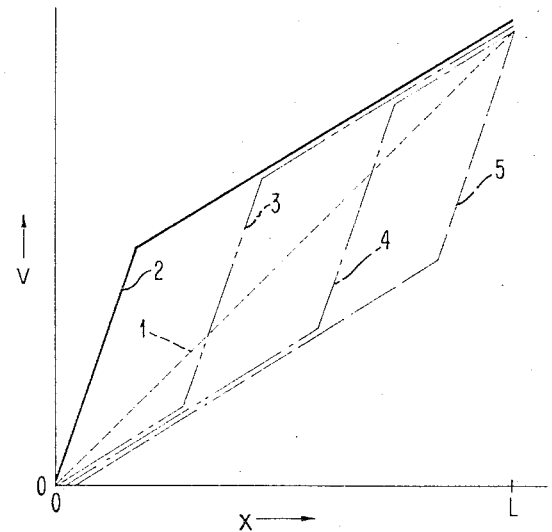

When a constant voltage (low impedance) source is used to drive the specimen, as in the microwave oscillator case, the situation is somewhat different from that just discussed. The potential is now fixed at the point $x=L$, as well as at $x=O$, and the growth of a high-field shock wave causes the field in parts of the specimen outside the wave to be reduced. The effect is illustrated in FIGURE 9B. In particular for curves 3, 4 and 5, the field at the cathode becomes less than the value corresponding to curve 1 which was sufficient to launch the shock wave. Thus, since the achievement of a critical local field $E_T$ is the event which triggers the instability, the existence of one shock wave within the specimen can inhibit the launching of a second wave from the cathode by reducing the field there to a value below $E_T$. This inhibition, is, of course, removed when the first shock wave reaches the anode and the potential distribution reverts temporarily to curve 1. By contrast, the field at the cathode under constant-current conditions is independent of the presence or absence of a shock wave elsewhere in the specimen and further shock waves can be launched at any time.

The following is a discussion of the results summarized previously.

(a) The onset of current fluctuations corresponds with the appearance of shock waves.

(b) As soon as the shock wave appears, the field in other parts of the specimen is reduced below $E_T$. Since GaAs is a nearly ohmic conductor under these field conditions, the current is reduced in proportion.

(c) A new shock wave is launched when, for any reason, the conduction current rises to $I_T$, and the field at the cathode consequently reaches $E_T$.

(d) The constancy of $I_{max}$ with changes of applied voltage can be explained in the same way.

(e) The effectiveness of the inhibition process illustrated in FIGURE 9B is obviously greatest in short specimens. In long specimens, the changes in field at the cathode are too small to control the launching of later shock waves which is thought to occur at random times.

(f) The same remarks apply to short specimens operating under nearly constant-current conditions.

(g) Under constant-voltage conditions, the inhibition mechanism is strong enough in short specimens to ensure that a shock wave is launched from the cathode when, and only when, the preceding wave reaches the anode. The generation of new shock waves thus takes place in a periodic manner.

Some evidence of this effect can be seen in FIGURE 8 where a new wave appears to be launched at a variable time around traces 35–44. This figure was obtained under conditions of high but not infinite external impedance so that the inhibition effect was weak but not non-existent.

(h) The period of the oscillations must be equal to the transit time of the shock wave which, as we have seen, travels with about the velocity of the electrons at threshold.

(i) The first shock wave builds up to its full amplitude before leaving the cathode. The modulation of the current is then as great as it can ever be.

(j) In very short specimens, the voltage $LE_T$ may be less than the voltage across the freely propagating shock wave. In that case, the shock wave probably remains attached to the cathode until some higher voltage is applied. Thus, the apparent threshold voltage will be higher than $LE_T$. This effect might account for the observed curvature of the I–V characteristics of very short specimens.

(k) Since the shock wave travels in the same direction as the electrons, it cannot involve minority carriers.

(l) In InP, the hole lifetime appears to be long enough that hole injection is possible from an avalanche associated with a very high field at the anode. This high field apparently arises only on the arrival there of the shock wave. Thus, the current must decrease for a time equal to the transit time of the shock wave before it can increase as a result of avalanche injection.

*Device applications*

The application and utilization of the unique phenomenon that has been discovered, namely, the moving distribution of electric field that can be produced within a crystalline specimen, will now be considered in more detail. However, before going into the specific detailed device embodiments, it is well to state first the basic considerations leading to device implementation as a result of the observations that have been made.

I. *Methods of controlling the launching of shock waves*

The fact has been noted in connection with the curves of FIGURE 8 that, once built up, the shock wave can propagate apparently in equilibrium form even though the applied field is reduced below threshold. This fact is borne out by reference to FIGURES 10A and 10B wherein are shown several pulse shapes. The first pulse shape in FIGURE 10A is a voltage pulse that is applied, in a circuit substantially the same as shown in FIGURE 3, to the crystalline wafer which is connected to a typical load. However, in this particular instance, the power source 4 would comprise, as one example and for convenience only, a pulse generator developing a basic pulse A as shown in FIGURE 10A and superimposed thereon a spike B. The spike B is of such magnitude that the total voltage exceeds, for a brief interval, the threshold value $V_T$, also shown in FIGURE 10A.

The resultant current pulse through the circuit of FIGURE 3 has the form shown in FIGURE 10B. Thus, it will be seen that the current drops from its maximum value at that instant of time when the total voltage exceeds the threshold $V_T$ but the current remains down after the spike B has terminated. In a typical case, the spike B would have a total duration of 0.2 nanosecond but the current decrease would continue for a period of about 2 nanoseconds (which for the particular specimen is approximately equal to the transit time of the shock wave).

It will therefore be appreciated that a shock wave will continue to propagate under conditions where it cannot be initiated. The shock wave will continue to propagate even though the impulse that caused it to begin propagating has terminated. Thus, even though the applied field has dropped below threshold when the voltage spike B has ended, the current decrease, as illustrated in FIGURE 10B, continues for a longer period of time.

The aforedescribed operation is that of a one-shot pulse stretching circuit with energy gain. Its more specific applications would be as a line driver, memory driver, or as a logical circuit using simultaneously or sequentially applied input signals.

In the last named application, that is, as a logical circuit, the same result of current variation as depicted in FIGURE 10B would be realized by applying several input signals in the form of voltage spikes to the device. In an inclusive OR logical circuit, each voltage spike would be selected to be of sufficient magnitude to cause the total voltage to exceed the threshold value $V_T$, as indicated in FIGURE 10A. Alternatively, an AND logical circuit would be simply realized by the selection of relatively smaller voltage spikes whose application separately would be insufficient but whose coincidence would have the effect of causing the total voltage to exceed the threshold value $V_T$.

A second basic method of launching shock waves for various specific device applications involves the imposition of local high fields applied, for example, by means of a third electrode affixed to the device wafer. This contrasts with the aforedescribed arrangement involving the application of over-voltage spikes to a two terminal device.

Referring now to FIGURES 11A, 11B, and 11C, there are shown several schemes for the imposition of local high fields at various points on the device body 30 to produce the launching of the aforesaid shock waves. In FIGURE 11A, the normal anode and cathode contacts 31 and 32 are made to opposite ends of the body 30 but an additional electrode 33, denominated a trigger electrode, has been affixed to the body, for example, by alloying to the bottom surface thereof. A basic power pulse is applied to the terminal marked +DC and the cathode 32 is grounded, as shown in FIGURE 11A. The basic power pulse shape is shown in FIGURE 12A and denoted $V_A$, the threshold value again being shown by the symbol $V_T$. Now, however, as contrasted with the previously described two terminal operation, a voltage spike $V_{TR}$ is applied to the input terminal and thence to the trigger electrode 33, as shown in FIGURE 11A. The trigger pulse shape is shown in FIGURE 12B. The resultant current pulse is denoted $I_A$ in FIGURE 12C and, as was the case previously, the current drops on the application of the trigger pulse $V_{TR}$ but remains at the lower value for a time period greater than the duration of the trigger pulse $V_{TR}$. FIGURES 11B and 11C merely illustrate other possible coupling configurations. In FIGURE 11B, the third or trigger electrode is shown affixed to the same end surface as the cathode contact 32 and, in FIGURE 11C, the trigger pulse is capacitively coupled to the wafer.

Another specific device embodiment that is a variant of the device configuration as shown in FIGURE 11A is an embodiment where the previously described microwave oscillator mechanism is employed, that is to say, the power source is a constant voltage source and is applied, as was shown in FIGURE 11A, to the anode 31. The same basic pulse shape is used as in the previous example and is redepicted in FIGURE 13A. However, now the trigger pulse $V_{TR}$ is made greater than the transit time for propagation of the shock wave throughout the body 30. The result is that the current takes the shape of the pulse shown in FIGURE 13C (labeled $I_A$). What is hereby realized is a modulated oscillator whose time period of generating oscillations is controlled by the duration of the trigger pulse $V_{TR}$ and is, therefore, susceptible to very rapid modulation.

Referring now to FIGURE 14, the detailed physical structure of the device, previously shown schematically in FIGURE 11B, is herewith depicted. The wafer 40 of GaAs, having a contact of AuGe, is shown mounted to a header 41 to which it is soldered. A thin wire or ribbon 42 is soldered to the top surface of the wafer 40 to which an ohmic contact 43 of AuGe has been made. The wire 42 is further connected to terminal posts 44 and 45. Also connected to these terminal posts are wires 46 and 47, respectively, and an additional wire 48 is connected to the header 41, all three of these wires being used for circuit connecting purposes. A saw cut 49 divides the top contact 43 into two portions, and the contact portion on the left forms the trigger electrode and the other portion serves as the cathode. It is important to keep the cathode area greater than about 80 percent of the maximum cross-sectional area of the wafer.

Other specific methods may also be employed to cause a local high field, as heretofore described, thereby to control the launching of shock waves. Such another method would be, for example, to transfer ground connections so as to pass current through a constricted region, as illustrated in FIGURE 15A. In the alternative, one can simply pulse such a current as illustrated in FIGURE 15B.

Still other methods of launching shock waves, for example, from a place other than the cathode, are as illustrated in FIGURES 16A and 16B. FIGURE 16A shows the general two-terminal configuration previously described. However, in this embodiment, a slot 50 is placed in the semiconductor body in order to constrict the area and to promote the development of a high local field in the region around the slot. Of course, this method is very similar to that described above in connection with FIGURES 15A and 15B except that here the embodiment is of a two-terminal device. Alternatively, to the same end, a portion of relatively high resistivity $\rho_1$ may be included in the semiconductor body of lower resisting $\rho_0$, as depicted in FIGURE 16B, such that the development of the required high field will be promoted in the higher resistivity portion of the body. It will thus be seen that the effective length L of the body for propagation of the electrical shock waves has been materially reduced in the above two cases.

Another arrangement, as illustrated in FIGURE 17, provides contact 51 and 52 comprising the anode and cathode on one surface of the semiconductor body and by use of a slot 53 the active region of the device is confined to the bulk portion immediately adjacent the slot 53. Thus, the total active length has been substantially reduced whereby tailoring of the device to fit specific electrical requirements may be readily obtained.

II. Methods of locally extracting energy or information from shock waves

The methods of locally extracting energy are roughly similar to the foregoing methods that have been described for launching shock waves.

For example, as illustrated in FIGURE 18, a voltage is picked off across part of the semiconductor body using ohmic contacts. As shown, an electrode 60 is used for output purposes. Between this electrode 60 and anode contact 61, a voltage signal will appear only when the shock wave is present in the region between the contacts 60 and 61. Thus, the duration of this output voltage signal is equal to the transit time of the shock wave between contacts 60 and 61 and may be made much less than the transit time through the entire body. This contrasts with the normal way of using the voltage drop across the entire body which gives a large pulse lasting for the entire transit time and which is the method that has been described and illustrated by FIGURE 12C.

A further technique of extracting energy would be the use of a capacitor pick up very similar to the case described in FIGURE 11C but, of course, rather than having the pick up at the input it would be at the other or output end of the body.

III. Combinations of launching and extracting means

Up to now, various specific launching and extracting means have been described. What will now be considered are combinations of these various means such that devices may be constructed to fulfill various electrical requirements. Referring now to FIGURES 19A–19F, these are symbolic representations for a number of applications involving the aforesaid combinations of means for launching shock waves in a semiconductor body and means for extracting information from that body. The symbols used in all the FIGURES are explained next to FIGURE 19C.

In the first case of a pulse stretching amplifier, as generally exemplified by FIGURE 19A and which has been specifically exemplified previously in FIGURE 11B, the output may be taken across the entire body or across a typical load which is connected to the appropriate pair of output terminals.

The basic device of the present invention may also be used for delay line purposes and this is illustrated in FIGURE 19B where the symbol at the input represents any of the launching means previously described and the symbol at the output represents the local signal extracting means already described. As a delay line, arbitrarily long delays are possible because of the self-sharpening nature of the shock wave. Even though the input pulse may be degraded and of poor characteristics, the output pulse, because it is generated by a shock wave phenomenon, will have a size and shape which are independent of the input pulse, provided only that the amplitude of that pulse is sufficient to launch a shock wave.

In FIGURE 19C, there is illustrated another typical application of a logical OR or NOR device wherein a number of separate inputs, here denoted input 1 and input 2, embodying particular launching means, are applied to the semiconductor body and an output is derived which is responsive to the presence of a signal at either input 1 or input 2 (logical OR). The logical NOR function can similarly be realized depending on the grounding point of the launching means.

In FIGURE 19D, a switch is illustrated for utilizing the electrical shock wave phenomenon of the present invention. In this example, the term switch is used in the railroad sense. Which branch is taken in the embodiment of FIGURE 19D depends on which branch carries the most current at the instant when the shock wave arrives at the fork. This is controlled by pulsing the currents in the branches differentially or by using additional contacts, shown dotted in the FIGURE, near the fork to obtain the same effect.

FIGURE 19E illustrates a shock wave combiner where the individual shock waves launched by the separate inputs A and B can propagate into the common output but there is good isolation between the separate inputs.

FIGURE 19F illustrates an inhibiting type of logic device. This embodiment is in accord with the previously expressed ideas on the oscillator mechanism, that is, the presence of one shock wave in the semiconductor body working under constant voltage conditions inhibits the launching of further shock waves until the one shock wave reaches the anode. By means of a suitable technique, for example, strobing, the logical functions shown next to FIGURE 16F are obtained. Thus, it will be seen that the input signals A and B are applied at times $t_A$ and $t_B$ and the outputs are sensed at times $t_1$ and $t_2$; $t_A$ and $t_B$, $t_1$ and $t_2$ are chosen to satisfy the following relationship:

$$t_2 - t_1 = t_B - t_A < T \text{ and } t_B - t_2 = T$$

where T is the transit time. Looking at the output portion of the pulse diagram at the sensed instant of time $t_1$, an output signal will appear only when input signal B is present. However, at a latter instant of time $t_2$, the precise function A and not B (A $\overline{\text{B}}$) is obtained. An output signal is present at time $t_2$, for example, in the first situation at the top, when input signal A is present and input signal B is not present; in the third situation, even though input signal A, is present there is no output since input signal B is also present. Thus, the presence of input signal B inhibits the appearance of an output signal even though input signal A is present.

In an alternative arrangement, an input signal B may be applied at another point on the body (shown dotted) nearer to the output means than is input signal A. By suitably proportioning the respective transit times for the shock waves generated by input signals A and B, the same essential inhibiting logical function may be obtained.

What has been described herein is an invention based on a discovery of the phenomenon of electrical shock waves which are produced by application of voltage beyond a threshold point to a crystalline body and, in particular, to a semiconductor crystalline body. Such phenomenon has been illustrated as finding application in a variety of device embodiments. However, no attempt has been made to exhaust all of the possible device embodiments that may be practicable. The notable advantages that accrue to the exploitation of this unique electrical shock wave phenomenon will be appreciated by those skilled in the art, particularly the fact that the speed of operation is not dependent on the achievement of very small physical dimensions.

Although the device geometries described have been mainly limited to rectangular ones, it will be understood that neither constant cross section nor plane external surfaces are necessary to the operation of many of the devices. For example, a body in the form of a truncated pyramid or cone with contacts on the bases thereof may be used to obtain control over the distribution of electric field.

While the invention has been particularly shown and described with reference to preferred embodiments thereof, it will be understood by those skilled in the art that various changes in form and details may be made therein without departing from the spirit and scope of the invention.

What is claimed is:

1. A signal translating apparatus comprising a body including a region of semiconductive material of single conductivity type and wherein current is flowing in a given direction,
    said region including means responsive to electric fields in excess of a threshold intensity applied along said given direction for varying carrier mobility to reduce the conductivity of said region such that current flow along said region is decreased,
    means for applying electric fields at least of said threshold intensity in said region along said given direction, and
    load means including resonant means coupled to said semiconductive body.

2. An apparatus for producing microwave oscillations comprising an n-type gallium arsenide wafer having a length less than $2 \times 10^{-2}$ cm.,
    ohmic contact means connected to said gallium arsenide wafer,
    means connected to said ohmic contact means for applying electric fields greater than 2000 v./cm. in said gallium arsenide wafer to produce coherent sustained current oscillations of microwave frequency therein, and
    load means connected to said gallium arsenide wafer.

3. An apparatus for producing microwave oscillations comprising an n-type indium phosphide wafer having a length less than $2 \times 10^{-2}$ cm.,
    ohmic contact means connected to said indium phosphide wafer,
    means connected to said ohmic contact means for applying electric fields greater than 6000 v./cm. in said indium phosphide wafer to produce coherent sustained current oscillations of a microwave frequency therein, and
    load means connected to said indium phosphide wafer.

4. A signal translating apparatus comprising
    a body of semiconductor material of single-type conductivity capable of forming therein high electric field regions which propagate along said semiconductive body,
    said semiconductive body exhibiting a first critical voltage at which high electric field regions are formed,
    said semiconductive body exhibiting a second critical voltage less than said first critical voltage at which high electric field regions when formed are sustained and propagated along said semiconductive body, and
    means including voltage means and a load connected to said semiconductive body for causing said first and second critical voltages to be applied in turn to said semiconductive body such that high electric field regions are formed and propagated along said semiconductive body.

5. A signal translating apparatus comprising a semiconductive region of single conductivity-type material,
    said region having the innate property of being responsive to electric fields in excess of a threshold intensity to produce a high electric field effect and cause a redistribution of electric fields within said region due to variations in carrier mobility so as to decrease the conductivity of said region,
    means for supporting current flow along said semiconductive region in a given direction and for applying electric fields in said semiconductive region along said given direction and at least in excess of said threshold intensity to produce said high electric field effect, and
    load means coupled to said semiconductive region.

6. A signal translating apparatus as defined in claim 5 wherein said semiconductive region is of non-uniform cross section and includes a constricted portion along said given direction, said applying means being operative to apply electric fields at least in excess of said threshold intensity at least in said constricted portion.

7. A signal translating apparatus as defined in claim 5 wherein said applying means includes a plurality of electric field-applying means, each of said plurality of electric field-applying means being independently operative to increase electric fields in excess of said threshold intensity in said semiconductive region.

8. A signal translating apparatus as defined in claim 5 wherein said applying means further includes biasing means for applying electric fields less than said threshold intensity to said semiconductive region along said given direction, said biasing means and each of said plurality of electric field applying means being cooperative to increase electric fields in excess of said threshold intensity in said semiconductive region.

9. A signal translating apparatus as defined in claim 5 wherein said applying means includes a plurality of electric field-applying means, two or more of said plurality of electric field-applying means being concurrently operative to increase electric fields in excess of said threshold intensity in said semiconductive region.

10. A signal translating apparatus as defined in claim 5 wherein said applying means includes a plurality of electric field-applying means, said plurality of electric field applying means being concurrently operative to increase electric fields in excess of said threshold intensity in said semiconductive region.

11. A signal translating apparatus as defined in claim 5 wherein said semiconductive region includes a higher resistivity portion along said given direction, said applying means being operative to apply electric fields at least in excess of said threshold intensity at least in said higher resistivity portion.

12. A signal translating apparatus comprising a semiconductive region of single conductivity-type material,
  said material in bulk form having the innate property of being responsive to a constant voltage across said region of said material in excess of a threshold value to periodically vary in time the conductivity of said semiconductive region such that current flow along said semiconductive region in a given direction fluctuates periodically in the form of coherent sustained oscillations,
  means for supporting current flow along said semiconductive region in a given direction and for applying a voltage at least in excess of said threshold value across said semiconductive region in said given direction to periodically vary in time the conductivity of said semiconductive region, and
  load means coupled to said semiconductive region.

13. A solid state device as defined in claim 12 wherein said semiconductive region is formed of n-type gallium arsenide.

14. A solid state device as defined in claim 12 wherein said semiconductive region is formed of n-type indium phosphide.

15. A signal translating apparatus as defined in claim 12 wherein said semiconductive region is formed of an n-type conductivity material.

16. A signal translating apparatus as defined in claim 12 wherein said semiconductive region is formed of an n-type material selected from the group consisting of gallium arsenide and indium phosphide.

17. A signal translating apparatus comprising a semiconductive region of single conductivity-type material,
  said material in bulk form having the innate property of being responsive to a constant voltage across said region of said material in excess of a threshold value to produce time-varying electric field effects which periodically vary in time the conductivity of said semiconductive region such that current flow through said semiconductive region in a given direction fluctuates periodically in the form of coherent sustained oscillations,
  means for supporting current flow along said semiconductive region in a given direction and for applying a voltage at least in excess of said threshold value across said semiconductive region in said given direction to produce coherent sustained oscillations in said current flow, and
  load means coupled to said semiconductive region for receiving said coherent sustained oscillations.

18. A signal translating apparatus as defined in claim 17 further comprising resonant means forming said load means.

19. A solid state device as defined in claim 17 wherein said semiconductive body is formed of a polar semiconductive material.

20. A signal translating apparatus comprising a body of semiconductive material of single conductivity-type,
  said semiconductive body itself including first means responsive to electric fields in excess of a threshold intensity for redistributing electric fields in said semiconductive body to define low and high intensity regions so as to decrease the conductivity of said semiconductive body such that current flow through said semiconductive body is decreased,
  means for supporting current flow along said semiconductive body in a given direction and for applying electric fields in said semiconductive body and along said given direction at least in excess of said threshold intensity to redistribute electric fields in said semiconductive body and to define a high electric field region in at least one portion of said semiconductive body, and
  load means coupled to said semiconductive body.

21. A signal translating apparatus as defined in claim 20 further including ohmic contacts to said semiconductive body, said applying means being connected to said ohmic contacts.

22. A signal translating apparatus as defined in claim 20 wherein said first means responsive to said electric fields is located in one portion of said semiconductive body.

23. A signal translating apparatus as defined in claim 20 wherein said supporting and applying means are connected along one surface of said semiconductive body.

24. A signal translating apparatus as defined in claim 20 wherein said semiconductive body itself further includes second means responsive to electric fields of a given intensity and less than said threshold intensity for propagating a high electric field region after said high electric field region has been produced in said semiconductive body from said one portion, said supporting and applying means being operative to apply electric fields at least in excess of said given intensity in other portions of said semiconductive body.

25. A signal translating apparatus as defined in claim 24 wherein said first and said second operative means are alternately to cyclically produce and propagate high electric field regions through said semiconductive body to periodically vary in time the conductivity of said semiconductive body such that current flow through said semiconductive body fluctuates periodically in the form of coherent sustained oscillations.

26. A signal translating apparatus as defined in claim 24 wherein said second means is operative to propagate said high electric field regions along said semiconductive body at least at a velocity of approximately $10^7$ cm./sec.

27. A signal translating apparatus as defined in claim 24 wherein said load means comprises means capacitively coupled to said semiconductor body for sensing changes in electric field intensity therealong.

28. A signal translating apparatus as defined in claim 24 wherein said load means is connected across a section of said semiconductive body along which said high electric field region is propagated.

29. A signal translating apparatus comprising a body of semiconductive material of single conductivity-type material and wherein current is flowing in a given direction,
  said semiconductive body including in a portion thereof first means responsive to electric fields in excess of a threshold intensity to produce an electrical shock wave,
  said semiconductive body including second means responsive to electric fields of a given intensity less than said threshold intensity to propagate an electrical shock wave after said electrical shock wave has been produced along said semiconductive body, the presence of said electrical shock wave in said semiconductive body varying the conductivity thereof to decrease current flow through said semiconductive body,
  means for applying electric fields in said semiconductive body along said given direction to produce and propagate an electrical shock wave along said semiconductive body in said given direction, and
  load means coupled to said semiconductive body.

30. A signal translating apparatus as defined in claim 29 wherein said applying means includes first electric field-applying means for applying electric fields of said given intensity in said semiconductive body and second electric field-applying means cooperative with said first electric field-applying means for increasing electric fields applied in said semiconductive body in excess of said threshold intensity.

31. A signal translating apparatus as defined in claim 29 wherein said applying means is operative to apply electric fields in excess of said threshold intensity at least in said portion of said semiconductive body whereat said first means is located.

32. A signal translating device comprising a body including a semiconductive region of single conductivity-type and through which current is flowing in a given direction,
    means for applying electric fields in excess of a threshold intensity to said semiconductive region along said given direction,
    said semiconductive region including means responsive to electric fields in excess of said threshold intensity for producing and supporting a time-varying electric field gradient, the presence of said electric field gradient in said semiconductive region varying the conductivity of said semiconductive region such that current flow in said semiconductive region is decreased, and
    load means coupled to said semiconductive region.

33. A signal translating apparatus as defined in claim 32 wherein said producing and supporting means is operative to propagate said time-varying electric field gradient along said semiconductive region at a velocity approximately equal to the drift velocity of charge carriers in said semiconductive region.

34. A signal translating apparatus as defined in claim 32 wherein said producing and supporting means is operative to propagate said time-varying electric field gradient along said semiconductive region at a velocity at least approximately equal to $10^7$ cm./sec.

35. A signal translating apparatus comprising a body including a portion of semiconductive material of single conductivity-type material,
    means for supporting current flow along said semiconductive portion in a given direction and for applying electric fields in said given direction and at least in excess of a threshold intensity in said semiconductive portion,
    said semiconductive portion having the inherent property of being responsive to electric fields of said threshold intensity for producing cyclically and for propagating successively high electric field regions along said semiconductive portion for a distance L and at a velocity $v$, the presence of a high electric field region along said semiconductive portion varying the conductivity of said semiconductive portion such that current fluctuations therethrough take the form of coherent sustained oscillations having a frequency given by the relationship $v/L$, and
    load means coupled to said semiconductive body.

36. A signal translating apparatus as defined in claim 35 wherein said velocity $v$ is at least approximately equal to $10^7$ cm./sec.

37. A signal translating apparatus as defined in claim 35 wherein said supporting and applying means includes a constant voltage source, and further comprising ohmic contact means connecting said constant voltage source to said semiconductive region.

38. An oscillator device comprising a semiconductive body of uniform conductivity type,
    means connected to said semiconductive body for supporting current flow along said semiconductive body and for applying electric fields to said semiconductive body along a given direction,
    said semiconductive body itself including means responsive to said connected means for producing and propagating in cyclic and successive fashion high electric field regions in said given direction along said semiconductive body at a velocity $v$, said semiconductive body exhibiting different conductivities during the presence and absence, respectively, of a high electric field region such that current flow through said semiconductive body varies periodically in the form of coherent sustained oscillations having a frequency related to said velocity $v$, and
    load means coupled to said semiconductive body.

39. An oscillator device as defined in claim 38 wherein said producing and propagating means is operative to propagate said high electric field regions along said semiconductive body at least at a velocity of approximately $10^7$ cm./sec.

40. A signal translating device comprising a semiconductive body of single conductivity-type material,
    means connected to said semiconductive body for applying electric fields in said semiconductive body at least of a given intensity and for supporting current flow along said semiconductive body in a same direction,
    said semiconductive body having the innate property of being responsive solely to electric fields of a threshold intensity to produce a high electric field region and to electric fields of a given intensity to propagate a high electric field region along said semiconductive body, the appearance of a high electric field region along said semiconductive body being effective to reduce the conductivity and modulate current flow through said semiconductive body, said connected means being operative to apply electric fields in excess of said given intensity during the presence of a high electric field region along said semiconductive body,
    input means for momentarily increasing the intensity of electric fields applied in at least a portion of said semiconductive body in excess of said threshold intensity, and
    load means coupled to said semiconductive body.

41. A signal translating device as defined in claim 40 wherein said input means is connected at an intermediate portion of said semiconductive body.

42. A signal translating device as defined in claim 40 wherein at least said input means is capacitively coupled to said semiconductive body.

43. A signal translating device comprising a semiconductive body of single conductivity-type,
    means for supporting current flow along said semiconductive body and for applying electric fields of given intensity in said semiconductive body along a given direction,
    said semiconductive body itself including first means in one portion thereof responsive to electric fields of a threshold intensity for generating a high electric field region wherein the mobility of charge carriers is changed,
    first and second means independently operative in time sequence to increase the intensity of electric fields in said semiconductive body at least in excess of said threshold intensity,
    said semiconductive body itself further including second means responsive to said supporting and applying means for propagating a high electric field region along said semiconductive body at a fixed velocity, the presence of a high electric field region in said semiconductive body varying the conductivity so as to modulate current flow through said semiconductive body in said given direction and inhibit said first means, and
    load means coupled to said semiconductive body and operative at time intervals subsequent to said first and second input means for sensing the presence of a high electric field region along said semiconductive body whereby logical functions are achieved.

44. A signal translating device comprising a body of semiconductive material of single conductivity-type and wherein current is flowing in a given direction,
    means for applying electric fields less than and in excess of a critical intensity in said semiconductive body along said given direction, said semiconductive body including means for producing a substantially uniform electric field distribution along said given direction in response to applied electric fields less than said critical intensity and an electric field gradient along said given direction in response to applied electric fields in excess of said critical intensity, the presence of an electric field gradient varying the conductivity of said semiconductive body to decrease current flow therethrough, and load means coupled to said semiconductive body.

45. A signal translating device as defined in claim 44 further including ohmic means formed of a semiconductive material of said single conductivity-type for connecting said applying means to said body of semiconductive material.

46. A signal translating device as defined in claim 44 wherein said semiconductive body includes means for producing said electric field gradient in a portion thereof, said semiconductive body further including means responsive to said applying means for propagating said electric field gradient thus produced along said semiconductive body in said given direction.

47. A signal translating device comprising a body of semiconductive material of single conductivity-type and wherein current is flowing in a given direction, means for applying electric fields in excess of a threshold intensity in said semiconductive body along said given direction, said semiconductive body including means responsive to said electric fields in excess of said threshold intensity for producing a time-varying high electric field effect due to a change in carrier mobility within said semiconductive body to periodically vary the conductivity of said semiconductive body and modulate current flow therethrough, and load means coupled to said semiconductive body.

48. A signal translating device as defined in claim 47 wherein said producing means is localized in a portion of said semiconductive body.

49. A signal translating device as defined in claim 48 wherein said semiconductive body includes means for propagating said high electric field effect along said semiconductive body and wherein said load means is responsive to said current flow in said semiconductive body.

50. A signal translating device comprising a body of semiconductive material, means for supporting current flow along said semiconductive body and for applying electric fields in excess of a threshold intensity in said semiconductive body along a same direction, said semiconductive body having the innate property of being responsive to said last-mentioned means when electric fields in excess of said threshold intensity are applied therein for producing, supporting, and propagating a time varying electric field effect due to variations in carrier mobility within said semiconductive body to vary the conductivity of said seciconductive body and modulate current flow in said same direction, and load means coupled to said semiconductive body.

51. A solid state device for generating coherent oscillations comprising a semiconductive body having a length less than $2 \times 10^{-2}$ cm., said semiconductive body having the innate property of being responsive to a constant voltage applied thereacross in excess of a threshold valve to periodically vary in time the conductivity of said semiconductive body such that current flow through said semiconductive body fluctuates periodically to produce coherent sustained oscillations, means for supporting current flow in said semiconductive body and for applying a voltage in excess of said threshold value across said semiconductive body to produce said coherent sustained oscillations, and load means coupled to said semiconductive body.

52. A solid state device as defined in claim 51 wherein said semiconductive body has a length greater than 1 micron and less than $2 \times 10^{-2}$ cm.

53. A solid state device as defined in claim 51 wherein said semiconductive body is formed of an n-type material selected from the group consisting of gallium arsenide and indium phosphide.

54. A solid state device as defined in claim 51 wherein said semiconductive body is formed of n-type gallium arsenide and having a length of 0.5 cm., and said applying means is operative to apply electric fields having an intensity of at least 1250 v./cm. in said semiconductive body.

55. A solid state device as defined in claim 51 wherein said semiconductive body is formed of n-type gallium arsenide and said applying means is operative to apply electric fields having an intensity greater than 2000 v./cm. in said semiconductive body.

56. A solid state device as defined in claim 51 wherein said semiconductive body is formed of n-type indium phosphide and said applying means is operative to apply electric fields having an intensity typically in the order of 6000 v./cm. in said semiconductive body.

57. A solid state device as defined in claim 51 further including ohmic contacts to said semiconductive body and means for serially connecting said applying means and said load means to said ohmic contacts.

58. A solid state device as defined in claim 51 wherein said ohmic contacts are formed of semiconductive material defining a non-rectifying junction with said semiconductive body.

59. A solid state device as defined in claim 51 wherein said semiconductive body is formed of a III–V semiconductor compound.

60. A solid state device comprising a body of semiconductive material of single conductivity-type and having a common section and a plurality of branch sections, said semiconductive material having the innate property of being responsive to electric fields of a threshold intensity for producing a high electric field region and to electric fields of a given intensity less than said threshold intensity for propagating said high electric field region after said high electric field region has been produced in the direction of applied electric fields, the presence of said high electric field region varying the conductivity of said semiconductive material, and means for supporting current flow along and for applying electric fields in said common section and a selected one of said branch sections to produce and propagate a high electric field region along said common section and said selected one of said branch sections.

61. A solid state device comprising a body of semiconductive material of single conductivity-type and having a common section and a plurality of branch sections, said semiconductive body itself including first means responsive to electric fields in excess of a threshold intensity for producing an electrical shock wave, said semiconductive body itself further including second means responsive to electric fields of a given intensity less than said threshold intensity for propagating said electrical shock wave after said electrical shock wave has been produced along said semiconductive body in the direction of said electric fields of said given intensity, the presence of said electrical shock wave varying the conductivity of said semiconductive material, first means for supporting current flow along and for applying electric fields of said given intensity in said common section and each of said branch sections of said semiconductive body, and second means for increasing the intensity of electric fields applied in said common section and a selected one of said branch sections in excess of said threshold intensity for a time sufficient to produce and propagate said electrical shock wave along said common section and said selected one of said branch sections.

References Cited

UNITED STATES PATENTS

| | | | |
|---|---|---|---|
| 2,740,940 | 4/1956 | Becker et al. | 333—80 |
| 2,794,917 | 6/1957 | Shockley | 317—234 X |
| 2,863,056 | 12/1958 | Pankove | 317—235 X |
| 2,891,160 | 6/1959 | Leblond | 317—235 X |
| 2,931,958 | 4/1960 | Arthur et al. | 317—234 |
| 2,948,837 | 8/1960 | Postal | 317—238 |
| 3,019,352 | 1/1962 | Wertwijn | 317—235 X |
| 3,090,014 | 5/1963 | Dacey | 332—52 |
| 3,167,663 | 1/1965 | Melngailis et al. | 317—235 X |
| 3,215,862 | 11/1965 | Erlbach | 307—88.5 |
| 3,234,482 | 2/1966 | Rowen et al. | 307—88.5 X |

FOREIGN PATENTS

| | | |
|---|---|---|
| 1,190,542 | 4/1959 | France. |
| 849,476 | 9/1960 | Great Britain. |

OTHER REFERENCES

Gunn, J. B., "The Gunn Effect," International Science and Technology, October 1965, pp. 43–56.

Gunn, J. B., "Microwave Oscillations of Current in III–V Semiconductors," Solid State Communications, vol. 1, 1963, pp. 88–91.

Gunn, J. B., "Instabilities of Current and of Potential Distribution in GaAs and InP," Proceedings of Symposium on Plasma Effects in Solids, presented at Paris, France on July 17, 1964.

Gunn, J. B., "Instabilities of Current in III–V Semiconductors," IBM Journal of Research and Development, April 1964, pp. 141–159.

Heeks, J. S., Woode, A. D., and Sandbank, C. P., "Coherent High Field Oscillations in Long Samples of GaAs," Proceedings of the IEEE, May 1965, pp. 554–555.

Hilsum, C., "Transferred Electron Amplifiers and Oscillators," Proceedings of the IRE, vol. 50, No. 2 February 1962, pp. 185–189.

Kroemer, H., "Theory of the Gunn Effect," Proceedings of the IEEE, vol. 52, December 1964, p. 1736.

McCumber, D. E., "Physics of the Gunn Effect and its Relevance to Devices," NEREM Record, November 1965, pp. 76–77.

Meisels, M., "How Important Are Those New Microwave Semiconductors?" Microwaves, December 1965.

Meisels, M., "Twenty Thousand Dollars for an Idea," Microwaves, April 1965.

Ridley, B. K., "Electric Bubbles and the Quest for Negative Resistance," New Scientist, vol. 22, May 1964, pp. 352–355.

Ridley, B. K., "Specific Negative Resistance in Solids," Proceedings of the Physical Society, vol. 82, 1963, pp. 954–966.

Ridley, B. K. and Pratt, R. G., "A Bulk Differential Negative Resistance Due to Electron Tunnelling Through an Impurity Potential Barrier," Physics Letters, vol. 4, No. 5, May 1, 1963, pp. 300–302.

Ridley, B. K. and Pratt, R. G., "Hot Electron and Negative Resistance Effects at 20° K. in N-Type Germanium Containing Gold," Proceedings of the 7th International Conference Physics of Semiconductors, July 19–24, 1964, pp. 487–493.

Ridley, B. K. and Watkins, T. B., "The Dependence of Capture Rate on Electric Field and the Possibility of Negative Resistance in Semiconductors," Proceedings of the Physical Society, vol. 78, July–December 1961, pp. 710–715.

Ridley, B. K. and Watkins, T. B., "Negative Resistance and High Electric Field Capture Rates in Semiconductors," Journal of Physical Chemical Society, vol. 22, 1961, pp. 155–158.

Ridley, B. K. and Watkins, T. B., "The Possibility of Negative Resistance Effects in Semiconductors," Proceedings of the Physical Society, vol. 78, August 1961, pp. 293–304.

Smith, Roland W., "Current Saturation in Piezoelectric Semiconductors," Physical Review Letters, vol. 9, No. 3, Aug. 1, 1962.

Udell, D. E., "The Gunn Effect—A New Electrical Phenomenon," IBM Research Reports, vol. 1, No. 1, November 1965.

"Waves Hit High Frequency," Science News Letter, Jan. 15, 1966, p. 38.

JOHN W. HUCKERT, *Primary Examiner.*

A. M. LESNIAK, *Assistant Examiner.*

UNITED STATES PATENT OFFICE
CERTIFICATE OF CORRECTION

Patent No. 3,365,583                                January 23, 1968

John B. Gunn

It is hereby certified that error appears in the above numbered patent requiring correction and that the said Letters Patent should read as corrected below.

In the heading to the drawings, sheets 1 to 9, line 2 and in the heading to the printed specification, line 2, "FIELD-RESPONSIVE", each occurrence, should read -- FIELD RESPONSIVE --. Column 1, line 11, "solid devices" should read -- solid state devices --; line 52, "they" should read -- then --; line 69, "additionel" should read -- additional --. Column 2, line 5, "comprising" should read -- comprising a --; line 52, "dV(X,t)/dt" should read -- dV(x,t)/dt --. Column 4, line 74, "incention" should read -- invention --. Column 5, lines 49 and 50, "specimeans" should read -- specimens --. Column 6, line 61, "A.C." should read -- a.c. --. Column 7, line 12, "A.C." should read -- a.c. --. Column 9, lines 6 to 9, the right-hand portion of the equation reading $$dx'd_y'dt \quad\quad \text{should read} \quad\quad dx'dy'dt$$

Column 13, line 26, "wafer" should read -- wafer 40 --; lines 46 and 47, "resisting" should read -- resistivity --; line 54, "contact" should read -- contacts --. Column 14, line 75, "16F" should read -- 19F --. Column 18, lines 30 and 31, "second operative means are alternately" should read -- second means are operative alternately --. Column 21, lines 59 and 60, "seciconductive" should read -- semiconductive --; line 69, "valve" should read -- value --.

Signed and sealed this 16th day of September 1969.

(SEAL)
Attest:

EDWARD M. FLETCHER, JR.                      WILLIAM E. SCHUYLER, JR.
Attesting Officer                              Commissioner of Patents